United States Patent [19]
Ledu

[11] Patent Number: 5,331,640
[45] Date of Patent: Jul. 19, 1994

[54] COMMUNICATION DEVICE BETWEEN A DIGITAL NETWORK AND A TELEMATIC EQUIPMENT

[75] Inventor: Jacques Ledu, Clamart, France

[73] Assignee: Omnitel, France

[21] Appl. No.: 460,136

[22] PCT Filed: Oct. 16, 1989

[86] PCT No.: PCT/FR89/00534

§ 371 Date: May 29, 1990

§ 102(e) Date: May 29, 1990

[87] PCT Pub. No.: WO90/04907

PCT Pub. Date: May 3, 1990

[30] Foreign Application Priority Data

Oct. 17, 1988 [FR] France .................... 88 13643

[51] Int. Cl.$^5$ .................................................. H04J 3/12
[52] U.S. Cl. .................................. 370/110.1; 375/8
[58] Field of Search .............. 375/7, 8, 121, 100; 370/110.1, 77; 358/442, 426

[56] References Cited

U.S. PATENT DOCUMENTS

| | | | |
|---|---|---|---|
| 4,485,472 | 11/1984 | Sproull et al. | 371/15 |
| 4,680,781 | 7/1987 | Amundson et al. | 375/121 |
| 4,799,144 | 1/1989 | Parruck et al. | 395/800 |
| 4,965,795 | 10/1990 | Coffelt et al. | 370/13 |
| 5,007,050 | 4/1991 | Kasparian et al. | 370/95.3 |

OTHER PUBLICATIONS

Joseph Brave, Editor in Chief, 'The State of the Modem,' Data Communications International, Jun. 1991, 86–98.
Proceedings of the International Conference on ISDN, Jun. 1988, (London GB) F. Caussarieu et al.; "Interface board for PC's providing SO interface with voice and data communications capabilities", pp. 251–262, see p. 251, lines 1–6; p. 252, lines 38–43; pp. 254–256; paragraphs 4-2, 4-3, and 4-5; pp. 258–261; paragraph 5.
Electronic Design, vol. 35, No: 29, 10 Dec. 1987, (Hasbrouck Heights, N.J., US), D. Gulick et al.: "Interface the ISDN to your PC with a voice/data board", pp. 85–88, see p. 85, left column, lines 16–37; p. 87, left column, line 21–p. 88, right column, line 2.
Proceedings International Symposium on Subscriber Loops and Services, 11–16 Sep. 1988, paper 4.3, IEEE (Boston, US), K. Kammerer: "User benefits of ISDN in Germany", pp. 70–74, see p. 73, right column, line 4, p. 74, left column, line 7.
Electrical Communication, vol. 61, No: 1, 1987 (Harlow, Essex, GB), D. Adolphs et al.: "Subsets, terminals, and terminal adapters for the public ISDN", pp. 72–80, see p. 78, right column, line 31–p. 79, right column, line 45 (cited in the application).
Wescon Conference Record, vol. 31, 1987, Paper 20/75, (Los Angeles, Calif., US), C. Stacey: "Build your own ISDN terminal/terminal adapter", pp. 1–7, see p. 5, left column, line 1–p. 6, right column, last line (cited in the application).
Commutation & Transmission, vol. 9, No: 3, 28 Sep. 1987, (Paris, FR), J.-L. Lavoisard et al.: "Les installations terminales d'abonnes", pp. 35–50, see p. 46, middle column, line 5–pg. 47, right column, line 6 (cited in the application).

*Primary Examiner*—Douglas W. Olms
*Assistant Examiner*—Shick Hom
*Attorney, Agent, or Firm*—Larson & Taylor

[57] ABSTRACT

A device for providing communications between an integrated services digital network (ISDN) and telematic equipment is provided. This device has an S-interface which is connected to the network, a coding-filtering-decoding circuit connected to the S-interface, and a modulator-demodulator circuit directly connected to said coding-filtering-decoding circuit and telematic equipment.

7 Claims, 1 Drawing Sheet

COMMUNICATION DEVICE BETWEEN A DIGITAL NETWORK AND A TELEMATIC EQUIPMENT

BACKGROUND OF THE INVENTION

The invention relates to devices for communicating between telematic equipments on the one hand and other telematic equipments or centralized services on the other hand.

In the specification, the term "telematic equipment" refers to equipments providing for electronic mail between terminals (telex, fax, teletex, file transfer), electronic post, data bank access and information center access. Moreover, the term "component" refers to one or several electronic circuits included in a single package.

Administrations of different countries are beginning to set a new type of network for progressively taking the place of the current switched network. This network is a digital one called "integrated services digital network". Such a network is provided for allowing a more reasonable, more efficient and cheaper implementation of current applications, with a better transmission quality.

Because telematic equipments provided for current switched network are yet in use and integrated services digital network is progressively established, a requirement is that current users may use services of this network without buying completely new equipments. So, it is required that some devices allow use of current telematic equipments with this new network.

Some devices called "adapters" are currently available. These adapters are for providing, at the side of telematic equipment, conditions simulating conditions of analogue switched network which have not been the subject of a complete international standardization. These adapters always include for this reason, at the side of the network, a specific circuit and, at the side of a telematic equipment, subscriber handling circuits which are not very integrated and so are relatively bulky and costly.

When a telematic equipment communicates through a switched network, it is connected to this network by a modem (modulator-demodulator). Such a modem always includes two groups of circuits, a first group (often including only one component) providing for the proper modem function, and a second group comprising subscriber line handling circuits, this group including several relatively bulky and costly components.

Subscriber line handling circuits of adapters and modems have a power consumption so high that they have to be connected to a specially provided power source (either specific or common with related telematic equipment).

The paper Electrical Communication, vol. 61, n° 1, 1987, pages 72–80, Harlow, Essex, GB, by D. Adolphs et al: "Subsets, terminals, and terminal adapters for the public ISDN", the paper Wescon Conference Record, vol. 31, 1987, communication 20/75, pages 1-7, Los Angeles, Calif., U.S., by C. Stacey: "Build your own ISDN terminal/terminal adapter", the european patent application n° 238 255, the paper Electronique Industrielle, n° 8, December 1986, pages 32–40, Paris, FR, by H. Geyer: "Le reseau numerique a interation de services", the paper IEEE International Conference on Communications'86, Toronto, 22-25th June 1986, vol. 3, pages 47.3.1-47.3.5, p. 1504-1508, IEEE, New York, U.S., by J. Chatterley et al.: "The ISDN PC: a flexible voice date workstation", and the paper Commutation & Transmission, vol. 9, n° 3, 28th September 1987, pages 35-50, Paris, by J.-L. Lavoisard et al.: "Les installations terminales d'abonnes" all indicate the possibility of designing a board for a computer forming an adapter connected between a telematic equipment and a digital network. The documents, when they are not too concise, indicate a distinct power source and subscriber line handling circuits.

SUMMARY OF THE INVENTION

The invention is based on the discovery that it is possible to eliminate any subscriber line handling circuit from adapter and modem, and so to eliminate a great portion of components of the current adapter-modem assembly.

Such an elimination not only considerably reduces the cost of the device, but also increases its reliability by cancellation of subscriber line handling function and, in some cases, allows direct use of the network as power source.

More precisely, the invention relates to a device for providing communications between integrated services digital network and a telematic equipment, which includes a S-interface to be connected to the network and a coding-filtering-decoding circuit connected to said S-interface; according to the invention, said device includes a modulator-demodulator circuit directly connected to coding-filtering-decoding circuit and for being connected to said telematic equipment. The term "directly" indicates that the device does not include any active subscriber line handling circuit.

Preferably, said modulator-demodulator circuit is a single component. In an alternative, said modulator-demodulator circuit includes several components each for supporting transfers according to at least a peculiar protocol.

Advantageously, said coding-filtering-decoding circuit is constituted by a single component.

In an advantageous embodiment, said device further includes at least a circuit for allowing transfers according to protocols suited to said digital network and connected at a position located between S-interface and coding-filtering-decoding circuit.

The device preferably includes a driving and controlling circuit for constituting an interface with a microcomputer.

Providing the whole device on a printed circuit board is very advantageous. In this case, the board includes preferably an edge connector to be fitted in an elongated connector of a mother board of a microcomputer and including connections of the driving and controlling circuit, and separated connectors for connecting S-interface and modulator-demodulator interface.

Other characteristics and advantages of the invention will arise more clearly from the following description, made in reference to the attached drawings wherein:

DESCRIPTION OF THE PREFERRED EMBODIMENT

Figure 1:
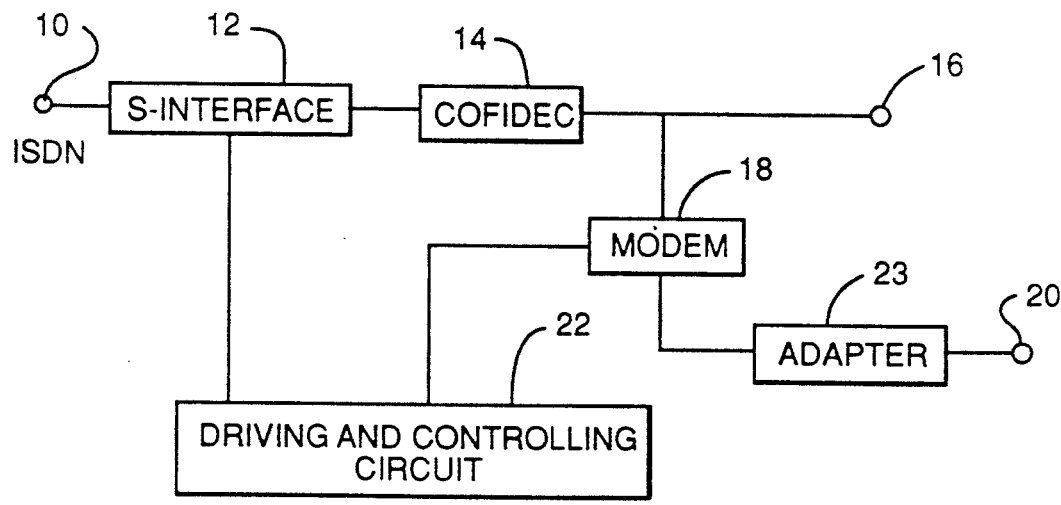
FIG. 1 is a block diagram of fundamental members of a device according to the invention.

FIG. 1 is a very simplified block diagram for illustrating basis concept of the invention. In this figure, terminal 10 represents connection to integrated services digital network ISDN, including two data channels B1 and B2 and a control channel D, Reference 12 refers to the physical control of a standardized interface called "S-interface" which is generally a single component. S-interface is connected to a coding-filtering-decoding circuit 14, generally formed by a single component called in an abbreviated form "COFIDEC". Cofidec may be integrated into S-interface. Terminal 16 simply indicates a possible direct connection of an equipment, for example for telephony, which may work through a RJ11 interface.

Reference 18 refers to the modem (modulator-demodulator) also preferably constituted by a single component. Modem is connected to the telematic equipment to be connected, through a V24/V28 adapting equipment 23 and terminal 20.

Reference 22 refers to a driving and controlling circuit for the whole device, as described with more details in the following in reference to FIG. 2.

Preferably, the whole device is mounted on a single printed circuit board to be fitted in a microcomputer. However, other uses are possible, for example as a separated housing.

In the prior art, S-interface and COFIDEC are associated to subscriber line handling circuits in an adapter, and the modem component is associated to other subscriber line handling circuits in the element usually called "modem". On the contrary, according to the invention, the absence of any line handling circuit is to be noted between the COFIDEC and the modem component.

Figure 2:
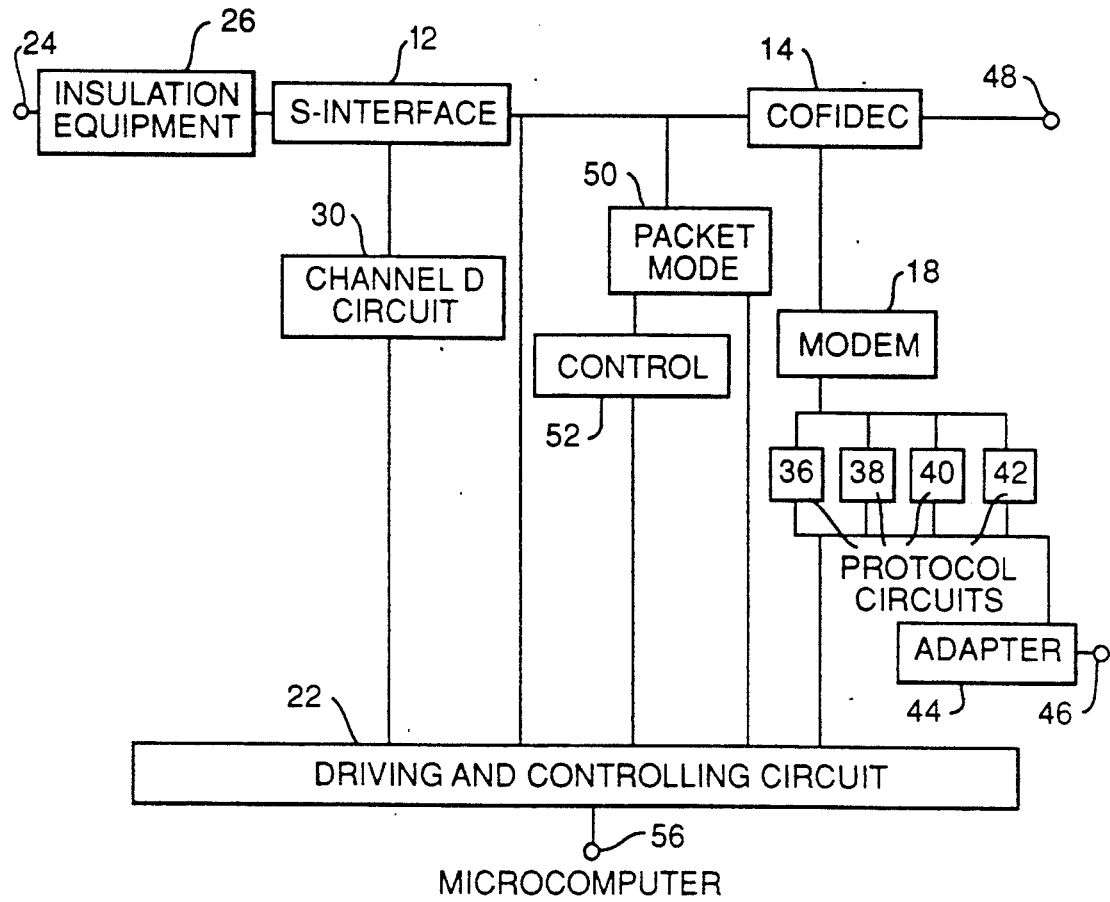
FIG. 2 is a more detailed block diagram of FIG. 1 device, including additional components giving additional functions.

FIG. 2 represents an embodiment including added elements for giving additional functions.

Between connection 24 to ISDN network and S-interface 12, a component 26 provides for insulation usually required in all coupling between a digital network and an equipment. Channel D is controlled by a circuit 30 according to standards relating to ISDN network. Reference 14 refers to COFIDEC and reference 30 to modem component. This last component allows direct use of some protocols, for example V21, V22, V22bis, V27ter and V29. References 36, 38, 40, 42 and 44 refer to circuits using other protocols, for example V42, MNP (36), V42 LAPM (38), T30 (40), AT-Hayes (42) and V24/V28 adapter (44). AT-Hayes is a protocol defined in a technical specification of Hayes Microcomputer Products, Norcross, Georgia, U.S.A., and other protocols are defined by the recommendations of CCITT. Terminal 46 corresponds to terminal 20 (V24/V28) and terminal 48 to terminal 16 of FIG. 1.

Reference 50 refers to a circuit for allowing transfers in packet mode through channel B. Reference 52 refers to a circuit for allowing transfers in V120 mode, proper to ISDN.

The different protocols previously indicated are only examples, and special means may be implemented for supporting only one of this mode, or, on the contrary, a Greater number of modes.

Reference 22 refers to a circuit similar to circuit 22 of FIG. 1 for driving the whole device, for controlling the circuits of the device and for constituting an interface between the device and a bus of a microcomputer schematically designed by reference 56. In fact, some controlling and driving functions are required, especially for channel D. The circuit preferably includes a microprocessor. It may advantageously implement functions of components 30, 50, 52, 36, 38, 40, 42.

In an example of circuit, S-interface is of ISAC-S type of Siemens, COFIDEC is of ARCOFI type of Siemens, V22/V22bis modem is of AM79CV14 type of AMD, and driving and controlling circuit is configured around an Intel I8OCI88 microprocessor.

According to a very advantageous feature of the invention and owing to the elimination of subscriber line handling circuits, the device requires no specific power source and may be directly powered by the network (especially in the case of implementation with CMOS circuits and in an external housing).

So, the invention allows manufacture of devices having a reduced cost and an excellent reliability and allowing the user to completely use advantageous possibilities of integrated services digital network.

Current technological evolution of components suggests that several of previous components will be integrated in a single component. However, this evolution will not change the invention crux.

I claim:

1. Device for providing communication between an integrated services digital network and telematic equipment, which includes a S-interface to be connected to said network, and a coding-filtering-decoding circuit connected to said S-interface,
    said device further including a modulator-demodulator circuit directly connected to said coding-filtering-decoding circuit and to be connected to said telematic equipment.

2. Device according to claim 1, wherein said modulator-demodulator circuit includes several components, each for supporting transfers according to at least one specific protocol.

3. Device according to claim 1, further including at least one circuit for allowing transfers according to protocols specific to said digital network and connected at a position located between said S-interface and said coding-filtering-decoding circuit.

4. Device according to claim 1, further including a driving and controlling circuit for constituting an interface with a microcomputer.

5. Device according to claim 1, wherein the entire device is located on a printed circuit board.

6. Device according to claim 5, wherein said board includes an edge connector to be fitted in an elongated connector of a mother board of a microcomputer and including connections of driving and controlling circuits.

7. Device according to claim 6, said board further includes separated connectors for connecting said S-interface and for connecting said modulator-demodulator.

* * * * *